United States Patent Office 3,558,735
Patented Jan. 26, 1971

3,558,735
DEHYDROGENATION OF ETHANE
William Q. Beard, Jr., Wichita, Kans., assignor to Ethyl Corporation, New York, N.Y., a corporation of Virginia
No Drawing. Continuation-in-part of application Ser. No. 800,360, Feb. 11, 1969, which is a continuation of application Ser. No. 444,403, Mar. 31, 1965. This application July 30, 1969, Ser. No. 846,270
Int. Cl. C07c 11/04, 17/10; B01j 11/40
U.S. Cl. 260—683.3
21 Claims

ABSTRACT OF THE DISCLOSURE

An ethane to ethylene oxydehydrogenation process and catalyst therefor which is composed of a low concentration of copper halide with rare earth halides, the ratio of rare earth halides to copper halide being greater than 1:1. Other preferred catalyst components include alkali metal halide and manganese halide.

CROSS REFERENCE TO RELATED APPLICATION

This application is a continuation-in-part of application Ser. No. 800,360, filed Feb. 11, 1969, and now abandoned, which is in turn a continuation of application Ser. No. 444,403, filed Mar. 31, 1965 and now abandoned.

BACKGROUND OF THE INVENTION

The present invention relates to the dehydrogenation of ethane to produce ethylene by a novel process.

Unsaturated hydrocarbons are commonly produced by either thermal cracking or catalytic cracking or a combination of both. In the known processes the principal disadvantage is low conversion of the saturated hydrocarbon to unsaturated hydrocarbon. In the literature, the reported conversion is rarely greater than about 40 percent. See, for instance, U.S. Patent 3,119,883, U.S. Patent 2,971,995, and British Patent 969,416. It will be seen that product streams containing less than 30 percent of ethylene are not uncommon. In addition to low hydrocarbon conversion, the prior art processes often result in a product containing a variety of materials which are difficult to separate. For instance, in the case where ethane is the feed material substantial quantities of acetylene and methane are often produced. When ethylene is the desired product, serious problems are encountered due to the difficutly of separating these materials. Also, when a catalyst is employed in the known processes, experience has shown that periodic shutdown is necessary due to the fouling of the catalyst with tars and resins. Also, in many cracking operations exceedingly high temperatures are often necessary, e.g. see U.S. Patent 3,119,883.

The primary purpose of this invention is to provide a process for the dehydrogenation of ethane to produce ethylene wherein the conversion of ethane to ethylene is substantially increased. Other purposes are the provision of (1) a continuous process wherein shutdown due to catalyst fouling is avoided, (2) a process which does not require excessively high temperatures, and (3) a process wherein the by-products formed, in addition to ethylene, are commercially valuable. Other purposes and advantages of this invention will become apparent hereinafter.

SUMMARY OF THE INVENTION

The present invention provides a process for the production of ethylene which comprises, in combination, contacting reactants comprising ethane, hydrogen chloride and oxygen with a fluidized catalytic material comprising a catalyst and a support in a reaction zone, said catalyst comprising from about 0.15 weight percent to about 3 weight percent copper chloride, based on the total weight of said catalyst and support, and rare earth halide, the weight ratio of said rare earth halide to said copper chloride being in excess of 1 to 1.

In addition, this invention provides a supported catalyst for the production of ethylene by the dehydrogenation of ethane in the presence of hydrogen chloride and oxygen which comprises, in combination, from about 0.15 weight percent to about 3 weight percent copper chloride, based on the total weight of said supported catalyst, and rare earth halide, the weight ratio of said rare earth halide to said copper chloride being in excess of 1 to 1.

DESCRIPTION OF THE PREFERRED EMOBDIMENTS

The above and other purposes are accomplished by a process for the dehydrogenation of ethane and the production of ethylene by contacting ethane with a fluidized catalyst, hydrogen chloride, and oxygen, the oxygen usually being in the form of air, at a temperature above 350° C., or preferably from about 400° C. to about 650° C., and a pressure above atmospheric, or preferably from about one atmosphere to about 30 atmospheres, the fluidized catalyst being composed of a mixture containing essentially from about 0.15 percent to about 3.0 percent copper chloride and from about 5 percent to about 20 percent rare earth halides (hydrated) supported on a fluidized carrier, the percentages being based on the total weight of catalyst and support. The weight percent of the rare earth halides as set forth in this application is based on the hydrated form, although such halides need not be hydrated during use. In the practice of this process, ethylene is recovered as the major product.

According to this process, ethane is converted to ethylene in yields as high or higher than 60 percent, and even as high as, for example, 87 percent, without the occurrence of catalyst fouling or the necessity of the excessive temperature normally associated with cracking operations. Furthermore, this method requires only non-consuming use of hydrogen chloride, which was at one time a troublesome by-product in the petrochemical industry and often disposed of by dumping into pits containing oyster shells, but now is in short supply and strong demand. Moreover, this process utilizes ethane, an abundant and inexpensive hydrocarbon, as a raw material for conversion into the more valuable chemical, ethylene.

The primary reason for these improved results is the use of a fluidized, supported mixture of copper chloride and rare earth halide. In all instances the ratio of rare earth halide (hydrated), preferably rare earth chloride, to copper chloride must exceed 1:1 and should very preferably fall within the ranges hereinafter specified. Preferred conditions are (in weight percent based on the total amount of catalyst and support) a catalyst mixture supported on a fluidized solid carrier containing essentially from about 0.15 to about 3.0 percent copper chloride and from about 5 percent to about 20 percent rare earth halides (hydrated). Preferably, the catalyst mixture contains from about 0.25 percent to about 2.0 percent copper chloride and from about 8 to about 15 percent rare earth halides (hydrated). More preferably, the catalyst mixture contains from about 0.25 percent to about 0.35 percent copper chloride and from about 8 to about 15 percent rare earth halides (hydrated). When the amount of rare earth halide and copper chloride in the catalyst significantly deviates from that specified above, ethylene is not usually produced and, if produced at all, is produced in only small quantities. Instead, chlorinated hydrocarbons are produced as the major product. This very significant relationship between the amount of copper chloride and rare earth chloride will be illustrated by the examples set forth below.

By the term "rare earth halide" is meant the halides of the elements in the Lanthanum series, that is, elements having an atomic number of from 57 through 71, and mixtures of these compounds. The rare earth elements are thulium, lanthanum, cerium, praseodymium, neodymium, prometheum, samarium, europium, gadolinium, terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient to use a commercially available mixture. The mixtures used in formulating the catalyst contain rare earth halides, preferably chlorides, or oxides or other mixtures. Examples of minerals containing the rare earths are zircon, thorite, monazite, gadolinite, cerite, orthite, and the like. The mixture known in the art as didymium is suitable, but the mixture extracted from monazite without removal of cerium and thorium is preferred.

The temperature of this process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres. The oxygen used in this invention is usually used in the form of air; however, pure oxygen may be employed if desired.

The fluidized support may be any of the known inert carriers such as sand, diatomaceous earth, alumina, silica gel, pumice, bauxite, chromia-alumina, and the like. Preferably the catalyst support is chromia-alumina, but alumina and silica are highly satisfactory. It is highly preferable that the particle size of the impregnated catalyst be within the range of from about 120 mesh to about 325 mesh (U.S. Sieve No.). In other words, the preponderance of the catalytic material be no coarser than about 120 mesh and no finer than about 325 mesh. There is no necessity that all particles be of uniform size. The size distribution generally varies throughout the ranges indicated. Usually it is preferred that not more than about 90 percent of the catalyst be finer than 325 mesh and that not more than 50 percent of the catalyst be coarser than 120 mesh.

If desired, an alkali metal halide may be added to the catalyst mixture in a concentration of from about 0.01 percent by weight to about 5 percent by weight, based on the total weight of catalyst support. Preferably, it is added in concentrations of about 0.05 percent to about 3 percent, and more preferably from about 0.1 to about 2 percent. The alkali metal halides employed are preferably the chlorides of lithium, sodium, potassium, rubidium and cesium. The addition of alkali metal halide to the catalyst mixture is a preferred embodiment of the invention, and among the alkali metal halides, lithium halide is most preferred.

Other catalyst additives also enhance the performance of the catalyst of this invention. Among such additives, manganese chloride in a concentration of from about 1 to about 10 percent by weight, based on the total weight of catalyst and support, is preferred. Other suitable catalyst additives include zinc chloride, calcium chloride, and titanium chloride, among which calcium chloride is preferred in a concentration of from about 1 to about 10 percent by weight, based on the total weight of catalyst and support.

The addition of iron chloride to the copper chloride containing catalysts has also been found beneficial, depending upon the type and quantity of other components in the catalyst. A concentration of from about 1 to about 10 weight percent of the iron chloride added, based on the total weight of catalyst and support, is preferred.

Another important feature of the invention is the molar feed ratio ethane/hydrogen chloride/air which varies in the ranges 1/1 to 3/2 to 5. When oxygen is substituted for air as the feed, this ratio varies in the ranges 1/1 to 3/0.4 to 1.

The rate of flow of gases through the reaction zone is subject to some variation. Thus, sufficient flow of gases must be provided for fluidization of the supported catalyst. On the other hand, gas flow should not be so extreme as to blow significant quantities of the catalyst out of the reaction zone. It is generally preferable that the superficial linear velocity of the gases entering the reactor be maintained within a range of from about 0.1 to about 5 feet per second. More preferably, for reasons of economy, the superficial linear velocity is maintained at from about 0.5 feet per second to about 3.5 feet per second. A suitable contact time is one ranging from about 1 second up to about 20 seconds, and preferably, for best conversion, the contact time should be from about 2 to about 15 seconds.

The feed ethane, oxygen (which may be used pure or as in air) and hydrogen chloride may be fed together into the bottom of the reactor. This can be varied however, and it is indeed often desirable to do so. For instance, two of the reactants are fed into one portion of the reaction zone and the other reactant into another portion. Thus, the hydrogen chloride and air can be fed together into the reaction zone at a point vertically displaced from the point at which the ethane is fed into the reaction zone. It is preferable to feed the hydrogen chloride and the oxygen into the bottom of the reactor and to feed the ethane into the reaction zone at a point vertically displaced therefrom.

In order to more fully describe the invention, the following examples are given.

EXAMPLE I

Ethane, hydrogen chloride and air were fed into the bottom of a vertically elongated reaction vessel in a molar ratio ethane/hydrogen chloride/air of 1:2.93:4.92.

The reaction vessel had been pre-charged with 40 grams of a fluidized catalyst composed of 0.5 weight percent copper chloride, 10.0 weight percent of a commercially available mixture of rare earth chlorides (hydrated), and 1.0 weight percent lithium chloride supported on commercially available granular silica. The feed rate was adjusted so as to maintain the catalyst in a fluidized state. The temperature within the reaction zone was maintained at about 475° C. and the pressure at about one atmosphere.

Operating in this manner, an ethane conversion to ethylene of 60.4 mole percent was achieved. 5.2 percent of the ethane was converted into chlorinated hydrocarbons.

EXAMPLE II

The procedure of Example I was repeated except that 60 grams of the catalyst were charged to the reaction vessel, and the temperature within the reaction zone was maintained at 500° C. 59.4 mole percent of the ethane was converted into ethylene and 4.0 mole percent into chlorinated hydrocarbons.

The procedure of this example was repeated maintaining a temperature of 525° C., and the ethane conversion to ethylene was 58.6 mole percent and to chlorinated hydrocarbons 4.3 mole percent. When this reaction was conducted utilizing a reaction temperature of 575° C., 56.6 mole percent of the ethane was converted to ethylene and 1.7 mole percent to chlorinated hydrocarbons.

EXAMPLE III

The procedure of Example I was repeated utilizing a feed ratio ethane/hydrogen chloride/air of 1:1.95:4.92. The catalyst differed only in that the copper chloride content was 0.25 weight percent, and the rare earth chloride (hydrated) content was 8.0 weight percent. 55.6 mole percent of the ethane was converted to ethylene and 3 mole percent to chlorinated hydrocarbons.

EXAMPLE IV

Ethane, hydrogen chloride and air were fed into a reaction vessel containing 40 grams of a fluidized catalyst composed of 0.25 weight percent copper chloride supported on fluidized granular alumina and 8.0 weight percentr are earth chloride (hydrated) and 1.0 weight percent lithium chloride. The feed ratio ethane/hydrogen chloride/air was 1:1.95:4.92, and the temperature within In the following examples ethane, hydrogen, chloride and air (or oxygen) were fed into the bottom of a vertically elongated reaction vessel precharged with a fluidizable catalyst. The catalyst compositions are in weight percent, based on the total weight of catalyst and support. The weight percent of the rare earth chlorides catalyst component (including cerium chloride and didymium chloride) is calculated on the basis of its hydrated form, although during use, it is not necessarily fully or even partially hydrated.

| Example | VIII | IX | X | XI | XII | XIII | XIV | XV | XVI |
|---|---|---|---|---|---|---|---|---|---|
| Molar feed ratio: | | | | | | | | | |
| $C_2H_6$/HCl/Air | 1/1.95/4.92 | 1/2/3.7 | 1/2/3.7 | 1/2/3.7 | 1/2/3 | 1/2.3/4 | 1/2/3 | 1/2/3.7 | 1/2/3.7 |
| Catalyst composition (wt. percent): | | | | | | | | | |
| $CuCl_2$ | 0.5 | 0.10 | 0.30 | 0.80 | 0.30 | 0.32 | 0.30 | 0.30 | 0.30 |
| Rare earth Cl (hydrated) | 15.0 | 10.0 | a 10.0 | b 10.0 | b 10.0 | 10.0 | 10.0 | 10.0 | 10.0 |
| LiCl | 0.1 | 0.04 | 0.06 | 0.06 | 0.06 | 0.06 | 0.4 | d 5.0 | 5.0 |
| Other | | | | | c 2.0 | | c 2.0 | | |
| Catalyst Support | (e) | (f) | (f) | (f) | (f) | (f) | (f) | (f) | (f) |
| Temperature (° C.) | 475 | 500 | 500 | 525 | 550 | 500 | 600 | 525 | 550 |
| Pressure (atm.) | 1 | 1 | 1 | 1 | 1 | 1 | 1 | 1 | 1 |
| Ethane conversion (percent) | 87.1 | 73.1 | 77.2 | 79.8 | 82.4 | 88.2 | 76.4 | 89.9 | 92.5 |
| Ethylene yield (percent) | 62.1 | 76.6 | 73.9 | 83.7 | 85.3 | 79.2 | 84.3 | 78.5 | 83.3 | a Didymium chloride. b Cerium chloride. c Iron chloride. d Sodium chloride. e Silica gel. f Alumina.

the reaction zone was 475° C. 51.6 mole percent of the ethane was converted to ethylene and 3.1 mole percent to chlorinated hydrocarbons.

EXAMPLE V

Each of Examples I through IV is repeated as described except that in each instance the supported catalytic mixture initially employed consists essentially of (a) 0.1 weight percent cerium chloride (hydrated) admixed with 0.07 weight percent copper chloride and 0.05 weight percent sodium chloride; (b) 5.0 weight percent cerium chloride (hydrated) admixed with 0.15 weight percent copper chloride and 3.0 weight percent potassium chloride; (c) 20.0 weight percent praseodymium chloride (hydrated) and 3.0 weight percent copper chloride; (d) 8 weight percent neodymium chloride (hydrated) and 0.25 weight percent copper chloride; (e) 15 weight percent of an equimolar mixture of the chlorides (hydrated) of cerium, praseodymium, neodymium, lanthamium, samarium, ytterbium and yttrium admixed with 2.0 percent cupric chloride. In each of the above runs good yields of ethylene are obtained.

EXAMPLE VI

The processes of Examples I–V are carried out as specified therein except that (a) the reaction temperature is maintained at 400° C., the pressure at 10 atmospheres, and the fluidized support is pumice; (b) the reaction temperature is maintained at 650° C., the pressure at 2 atmospheres, and the fluidized support is bauxite. In each of these runs ethylene is produced in good yields.

EXAMPLE VII

The process of Examples I–VI are repeated in the same fashion except that (a) ethane is fed into the upper portion of the fluidized reaction zone, and the hydrogen chloride and oxygen are fed together into the bottom of the reaction zone; (b) hydrogen chloride and oxygen are fed together into the upper portion of the fluidized bed, and ethane is fed into the bottom of the reaction zone; (c) ethane and hydrogen chloride are fed into the bottom of the reaction zone, and oxygen is fed into the upper portion of the reaction zone; (d) ethane and oxygen are fed into the bottom of the reaction zone, and hydrogen chloride is fed into the upper portion. Ethylene is recovered in good yields from each of these runs.

EXAMPLE XVII

The procedure of the preceding examples was repeated employing the following alumina supported catalysts (in weight percent, based on the total weight of catalyst and support): (1) 0.35 percent copper chloride, 10.0 percent rare earth chlorides (hydrated), and 0.07 percent lithium chloride; (2) 0.30 percent copper chloride, 10.0 percent rare earth chlorides (hydrated), 1.0 percent lithium chloride, and 4.0 percent manganese chloride; (3) 0.30 percent copper chloride, 10.0 percent rare earth chlorides (hydrated), 1.0 percent lithium chloride, and 6.0 percent calcium chloride; (4) 0.30 percent copper chloride, 10.0 percent rare earth chlorides (hydrated), 1.0 percent lithium chloride, and 4.0 percent zinc chloride; (5) 0.30 percent copper chloride, 10.0 percent rare earth chlorides (hydrated), and 5.0 percent potasium chloride; (6) 0.30 percent copper chloride, 10.0 percent rare earth chlorides (hydrated), 1.0 percent lithium chloride, and 4.0 percent manganese chloride. Good yields of ethylene were obtained with each catalyst.

EXAMPLE XVIII

The preceding examples are repeated so that each example includes runs which differ with regard to use of the following copper chloride concentrations (in weight percent, based on the total weight of catalyst and support): 0.01, 0.05, 0.1, 0.15, 0.2, 0.25, 0.3, 0.35, 0.4, 0.45, 0.5, 1.0, 5.0, 10.0. Optimum results are indicated to be between 0.25 and 0.35 weight percent.

EXAMPLE XIX

The preceding examples are repeated so that each example includes runs which differ in the use of the following iron chloride concentrations (in weight percent based on the total weight of catalyst and support): 1, 3, 5, 7, 10.

EXAMPLE XX

The preceding examples are repeated so that each example includes runs which differ with regard to use of cerium chloride, didymium chloride, or rare earth chlorides extracted from monazite without removal of cerium or thorium, each in the following concentrations (in weight percent, based on the total weight of support and hydrated catalyst): 0.01, 0.1, 1, 5, 10, 15, 20. Cerium chloride performs best, and optimum results therefor are indicated to be between 5 and 15 weight percent.

EXAMPLE XXI

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.1, 0.5, 1, 2, 5, 10. Lithium chloride performs best, and optimum results therefor are indicated to be between 0.5 and 2 weight percent.

EXAMPLE XXII

The preceding examples are repeated so that each example includes runs which differ with regard to use of manganese chloride, calcium chloride, zinc chloride or titanium chloride, each in the following concentrations (in weight percent, based on the total weight of catalyst and support): 0.01, 1, 5, 10, 20. Manganese chloride performs best, with calcium chloride being better than either zinc chloride or titanium chloride; optimum results for both manganese chloride and calcium chloride are indicated to be between 1 and 10 weight percent.

EXAMPLE XXIII

The preceding examples are repeated so that each example includes runs at the following temperatures: 300° C., 350° C., 650° C. and 700° C. Optimum results are indicated to be between 350° C. and 650° C.

EXAMPLE XXIV

The preceding examples are repeated so that each example includes runs which differ with regard to use of the following catalyst supports: sand, diatomaceous earth, alumina, silica gel, pumice, bauxite, or chromia-alumina. Chromia-alumina performs best, with alumina and silica gel being better than the other supports.

EXAMPLE XXV

The preceding examples are repeated so that each example includes runs which differ with regard to the following pressures (in atmospheres): 2, 5, 10, 13, 15, 20, 30.

EXAMPLE XXVI

The preceding examples are repeated so that each example includes runs which differ with regard to the use of pure oxygen or air as a component of the feed stream.

When this process was conducted without the rare earth chlorides or with copper chloride in amounts greater than the rare earth chloride employed, the ethylene yield was sharply reduced and often chlorinated hydrocarbons predominated.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol and the contents stirred until completely homogenous. The water or alcohol is then evaporated at low temperature from the so-formed slurry. The evaporation is conveniently done by drying at a low temperature, e.g. about 100° C., in a low temperature air circulating oven. The dry impregnated support remaining can then be employed in the process of this invention.

What is claimed is:

1. A process for the production of ethylene which comprises, in combination, contacting reactants comprising ethane, hydrogen chloride and oxygen with a fluidized catalytic material comprising a catalyst and a support in a reaction zone, said catalyst comprising from about 0.15 weight percent to about 3 weight percent copper chloride, based on the total weight of said catalyst and support, and rare earth halide, the weight ratio of said rare earth halide to said copper chloride being in excess of 1 to 1.

2. The process of claim 1 further characterized by said rare earth halide being present in a concentration of from about 5 to about 20 weight percent in its hydrated form, based on the total weight of catalyst and support.

3. The process of claim 1 further characterized by said catalyst including alkali metal halide.

4. The process of claim 3 further characterized by said alkali metal chloride being lithium chloride and being present in a concentration of from about 0.05 to about 3.0 weight percent, based upon the total weight of catalyst and support.

5. The process of claim 1 further characterized by one of said reactants being fed to said reaction zone at a point substantially vertically displaced from the feed point for the other of said reactants.

6. The process of claim 5 further characterized by said one of said reactants being ethane.

7. The process of claim 1 further characterized by said support being selected from the group consisting of chromia-alumina, alumina and silica.

8. The process of claim 1 further characterized by said catalyst including a compound selected from the group consisting of manganese chloride, calcium chloride, zinc chloride and titanium chloride.

9. The process of claim 8 further characterized by said compound being present in a concentration of from about 1 to about 10 weight percent, based on the total weight of catalyt and support.

10. The process of claim 1 further chaarcterized by said catalyst including iron chloride.

11. The process of claim 10 further characterized by said iron chloride being present in a concentration of from about 1 to about 10 weight percent, based on the total weight of catalyst and support.

12. The process of claim 1 wherein said reaction zone is maintained at a pressure of from atmospheric to about 30 atmospheres.

13. A supported catalyst for the production of ethylene by the dehydrogenation of ethane in the presence of hydrogen chloride and oxygen which comprises, in combination, from about 0.15 weight percent to about 3 weight percent copper chloride, based on the total weight of said supported catalyst, and rare earth halide, the weight ratio of said rare earth halide to said copper chloride being in excess of 1 to 1.

14. The catalyst of claim 13 further characterized by said rare earth halide being present in a concentration of from about 5 to about 20 weight percent in its hydrated form, based on the total weight of the supported catalyst.

15. The catalyst of claim 13 further characterized by the inclusion of an effective amount of alkali metal halide.

16. The catalyst of claim 15 further characterized by said alkali metal halide being lithium chloride and being present in a concentration of from about 0.05 to about 3.0 weight percent, based on the total weight of the supported catalyst.

17. The catalyst of claim 13 further characterized by the support being selected from the group consisting of chromia-alumina, alumina and silica.

18. The catalyst of claim 13 further characterized by inclusion of an effective amount of a compound selected from the group consisting of manganese chloride, calcium chloride, zinc chloride, and titanium chloride.

19. The catalyst of claim 18 further characterized by said compound being present in a concentration of from about 1 to about 10 weight percent, based on the total weight of the supported catalyst.

20. The catalyst of claim 13 further characterized by inclusion of an effective amount of iron chloride.

21. The catalyst of claim 20 further characterized by said iron chloride being present in a concentration of from about 1 to about 10 weight percent, based on the total weight of the supported catalyst.

(References on following page)

References Cited

UNITED STATES PATENTS

| | | | |
|---|---|---|---|
| 2,838,577 | 6/1958 | Cook et al. | 260—656 |
| 3,159,455 | 12/1964 | Skaperdas et al. | 23—216 |
| 3,205,280 | 9/1965 | Wattimena et al. | 260—680 |
| 3,217,064 | 11/1965 | McGreevy et al. | 260—683.3 |
| 3,267,161 | 8/1966 | Ukaji et al. | 260—659 |
| 3,278,627 | 10/1966 | Hartnett | 260—683.3 |
| 3,308,184 | 3/1967 | Bajars | 260—680 |
| 3,308,197 | 3/1967 | Bajars | 260—680 |
| 2,204,733 | 6/1940 | Miller | 252—462X |
| 2,337,421 | 12/1943 | Spence et al. | 252—462X |
| 3,197,418 | 7/1965 | Maebashi et al. | 252—462X |

DELBERT E. GANTZ, Primary Examiner

G. E. SCHMITKONS, Assistant Examiner

U.S. Cl. X.R.

252—455; 260—656, 662

PO-1050
(5/69)

UNITED STATES PATENT OFFICE
CERTIFICATE OF CORRECTION

Patent No. 3,558,735          Dated January 26, 1971

Inventor(s) William Q. Beard, Jr.

It is certified that error appears in the above-identified patent and that said Letters Patent are hereby corrected as shown below:

Column 3, line 51, reads "catalyst support", should read --catalyst and support--. Column 5, line 8, reads "centr are earth", should read --cent rare earth--.

Signed and sealed this 3rd day of August 1971.

(SEAL)
Attest:

EDWARD M. FLETCHER, JR.        WILLIAM E. SCHUYLER
Attesting Officer              Commissioner of Pat